May 9, 1950  F. W. COFFING  2,506,705
CABLE OR CHAIN JACK
Filed April 12, 1946  2 Sheets-Sheet 2
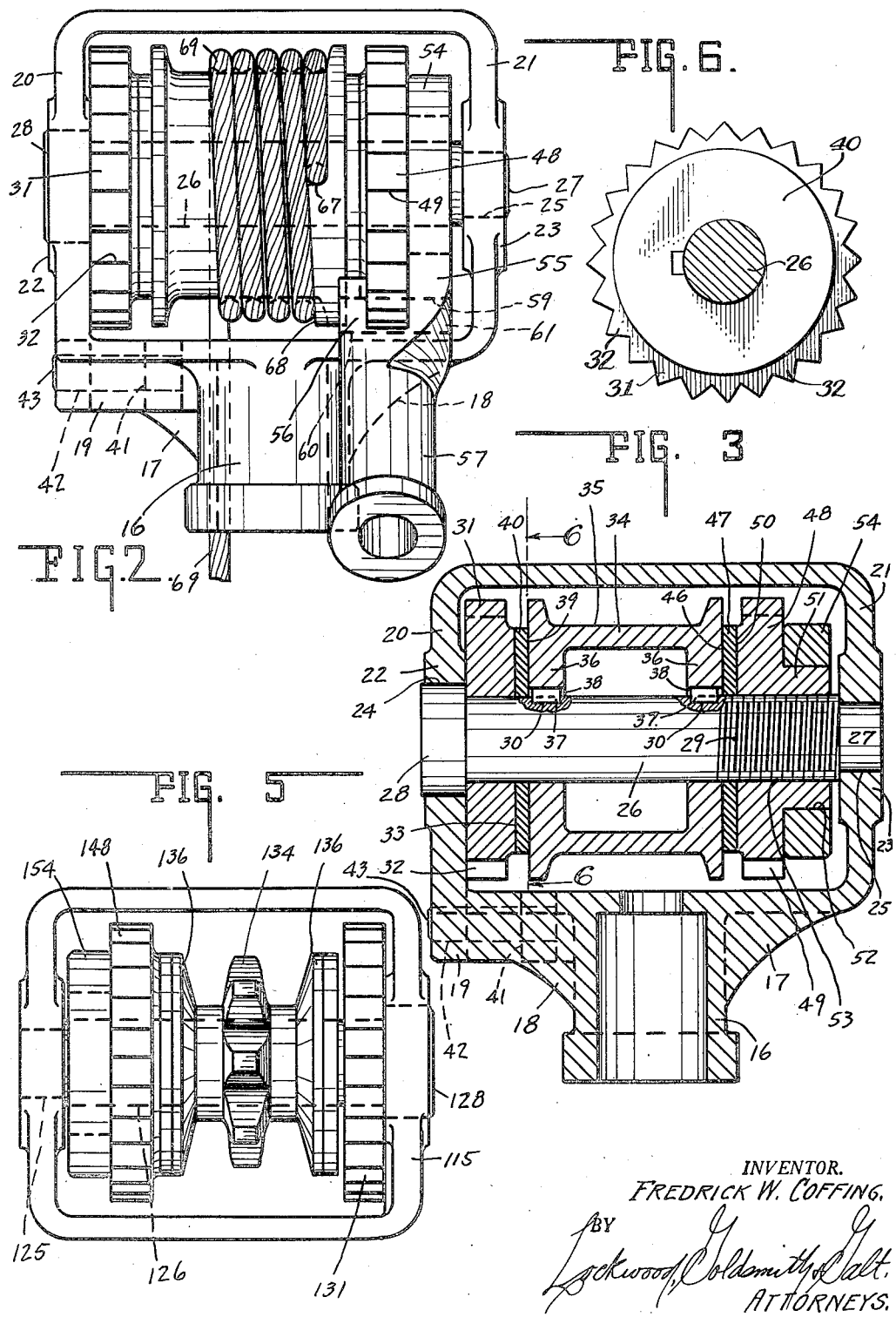
INVENTOR.
FREDRICK W. COFFING,
BY
Lockwood, Goldsmith & Galt,
ATTORNEYS.

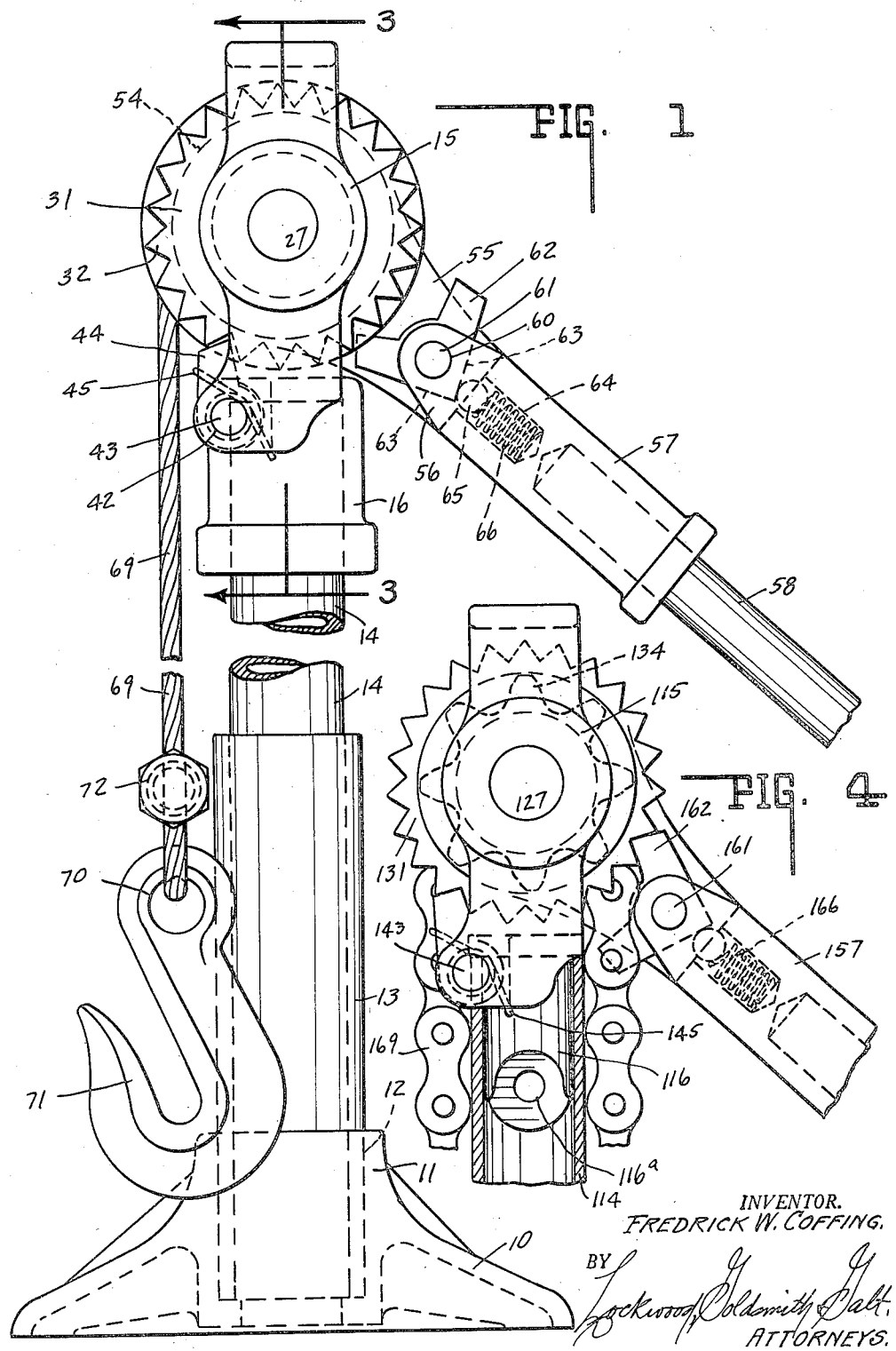

Patented May 9, 1950

2,506,705

UNITED STATES PATENT OFFICE 2,506,705

CABLE OR CHAIN JACK

Fredrick W. Coffing, Danville, Ill., assignor to Coffing Hoist Company, Danville, Ill., a corporation Application April 12, 1946, Serial No. 661,735

3 Claims. (Cl. 254—146)

This invention relates to a structure embodying a flexible, substantially non-extensible line means, a reversely rotatable member operatively associated therewith, an actuating handle, a pawl and ratchet, and clutch means.

The chief object of this invention is to simplify structures of the aforesaid general type and embody same in a jack structure having suitable standard means, and a load engaging line means carried member such as a hook adapted for motor vehicle bumper or spring engagement.

The chief feature of the present invention resides in the aforesaid standard and member in combination with a selective clutch, a reversely rotatable ratchet, handle carried, a reversible pawl means, a second clutch, an unidirectional free ratchet and a locking pawl.

Other objects and features of the invention will be set forth more fully hereinafter.

While hereinbefore the jack has been mentioned as applied to a vehicle spring, bumper, and the like it is to be understood that such jack may be applied to other objects whenever desired or required.

The full nature of the invention will be understood from the accompanying drawings and the following description and claims.

In the drawings, Fig. 1 is a side elevational view of a winding drum and cable type embodiment of the invention, parts being shown in the load holding position.

Fig. 2 is an end view thereof looking toward the operating handle side.

Fig. 3 is a central sectional view taken on line 3—3 of Fig. 1 and in the direction of the arrows.

Fig. 4 is a view similar to Fig. 1 and of a sprocket gear and sprocket chain embodiment of the invention.

Fig. 5 is an end view thereof taken from the side opposite that shown in Fig. 2.

Fig. 6 is a plan view of the load holding gear type ratchet, the associated washer and shaft and spline connection accommodation taken on line 6—6 of Fig. 3.

In Fig. 1 of the drawings, 10 indicates a base plate with collar formation 11, provided with socket 12 to seat, support and sustain tubular member 13 of the desired length. This preferably is rigid with the base.

Telescopically seated in member 13 is the standard forming tube 14 of the desired length necessary to position the housing 15 at the maximum elevation required. Tube 14 may constitute a piece of ordinary gas pipe.

The housing 15 includes a depending socket providing portion 16 that telescopes upon the upper end of pipe 14 and bears on the upper end thereof. The housing is of open rectangular type, see Fig. 2, ribbed as at 17 and 18, see Fig. 3, and provided with a boss 19. In alignment, in the opposite sides 20 and 21 of said housing, are the enlarged bearing portions 22 and 23, respectively, apertured at 24 and 25, respectively, for shaft mounting purposes.

A shaft 26 has a reduced end 27, rotatably supported in bearing opening 25 and its enlarged or head end 28 is rotatably supported in the comparatively larger bearing aligned opening 24. A portion of the shaft, adjacent portion 27, see Fig. 3, is provided with a left hand thread 29 and the shaft includes elongated keyways 30 or the like.

Rotatable upon the shaft 26 and adjacent bearing portion 22 is the relatively stationary ratchet 31, having teeth 32, and a finished face portion 33. A winding drum 34, having a cable mounting periphery 35, includes side plate portions 36, which are keyed to the shaft by keys 37, keyways 38, and the keyways 30 aforesaid.

Gear 31 and washer 33 are each notched to pass aligned keys 37 when said notches are registered with each other and notches 38 of the member 34 and shaft 26 is passed into these several members for initial assembly. For disassembly the same registration is necessary. Otherwise such registration is unnecessary.

Plate 36 of said drum closest to ratchet wheel 31, is faced as at 39, and between the two is interposed a friction disc 40. This in effect is a friction clutch. The boss 19 in the housing is notched as at 41 and is also transversely bored as at 42 to take a bolt or pin 43, upon which is pivoted pawl 44, see Fig. 1, for engagement with teeth 32 of ratchet 31. A spring 45 suitably constrains this pawl 44 to tooth engagement. Thus the ratchet 31 can freely rotate clockwise, see Fig. 1, but not counterclockwise.

Referring to Fig. 3, it will be noted that the opposite face 46 of the other plate 36 on drum 34 is adjacent a second friction disc 47. These discs 40—47 may be of fibre, brake lining material, or the like. Both discs are rotatably mounted on the shaft and for economy of manufacture may be identical.

Also, shown in Fig. 3 in greatest detail is the lifting and reversible ratchet 48, having teeth 49 thereon, and on the side adjacent disc 47 is the faced portion 50. Projecting from the opposite side of this ratchet is the collar portion 51 that has a cylindrical exterior surface 52, concentric with the shaft axis. The interior of the ratchet and collar is threaded as at 53 for threading and unthreading movement upon the threaded portion 29 of the shaft.

Rotatably mounted on the cylindrical surface 52 is the handle yoke portion 54, see Fig. 3. This yoke portion, see Figs. 1 and 2, lies at one side of the central plane of the handle. The yoke extends outwardly at 55, see Fig. 1, and in spaced and parallel relation thereto is portion 56. The outer end includes socket 57 arranged to take a pipe or handle 58, see Fig. 1.

The portions 55 and 56 are transversely apertured at 59 and 60, see Fig. 2, and mount pivot pin 61. Pivotally mounted thereon is the V-shaped dual pawl 62, see Fig. 1, having the opposed locking faces 63. The socket portion 57 is bored at 64, see Fig. 1, and therein is mounted a ball lock 65, constrained toward pawl engagement by spring 66, seated in the bore 64.

For load-raising, the V-pawl is positioned as shown in Fig. 1. For load lowering, the pawl is tilted counterclockwise on its pivot 61, see Fig. 4, so that the other side of pawl 62 thereof engages the ratchet 48. Finger pressure on this pawl, sufficient to overcome the force of spring 66 is sufficient for the shift of this pawl 62 to the selected position.

As shown in Fig. 2, the drum 34 includes a radial aperture 67, and the adjacent plate includes a wedged shaped face 68. The cable 69 bears against this face and passes through the aperture 67 and the inner end is knotted or provided with suitable means (not shown) to anchor the cable to the drum. As the latter is rotated clockwise, see Fig. 1, the cable is wound up on the drum for load elevation, see Fig. 2. When it rotates counterclockwise, the cable 69 unwinds from the drum for load lowering. The transverse top portion connecting portions 20—21 of the housing insures single layer winding of the cable 69, see Fig. 2. The free end of the cable is passed through eye 70 of hook 71, and the cable clamp 72 secures the free end to the cable adjacent the eye for anchoring the hook to the cable. This hook can be engaged with the bumper, bumper bracket, or a relatively exposed portion of the spring, as at the shackle or the frame connection thereto for elevation of the vehicle or the like.

*Load elevating operation*

With the parts in the position illustrated in Fig. 1, the hook is applied to the load and handle 58 elevated. Pawl 62 ratchets upon ratchet 48, and the load is sustained by pawl 44 in ratchet 32 of ratchet wheel 31. Then after the load has been elevated sufficiently V-pawl 62 is reversed. In this reverse movement, pawl 62 rotates the ratchet 48 counterclockwise. Ratchet 31 remains stationary.

When, however, the load is on the chain or cable the pawl 44 prevents retrograde movement of ratchet 31. The initial rotation of ratchet 48 threads chain or cable on the drum 34 so that after the required amount of rotation of ratchet 48 is effected, ratchet 48, disc 47, the drum 34, disc 40, and ratchet 31 are unitized and rotate clockwise as a unit for cable winding and load elevation by pumping on the handle. Pawl 44, when the load has been sufficiently elevated, serves as the load holding element.

*Load lowering operation*

With the load on the cable and parts stabilized and held by pawl 44, the handle 58 is elevated and pawl 62 tilted on pivot 61 so that the upper tooth is now engaged with ratchet 48. Pumping of the handle first serves to unthread, as it were, ratchet 48 upon the shaft and releases pressure on fibre discs 40 and 47 allowing drum 34 to unwrap cable thereby lowering load as desired. This releases the clutch sufficiently to free ratchet 31 from the shaft to permit reverse rotation of the drum. Ratchet 31 is now held stationary by pawl 44. The load is lowered by pumping on the handle as before. During the non-working portion of the load lowering handle movement, the load is held by pawl 44 as before. During the working portion of that movement, the load is carried by and lowered with the handle.

It will be noted, see Fig. 3, that the drum is keyed to the shaft 26, but said drum moves along with the shaft in the clutching and declutching operations.

It will, also, be noted that assembly of the parts is comparatively easy and as follows: The shaft end 27 is first passed through opening 24, then through ratchet 31, disc 40, and then drum 34, the keyways being matched and keys applied. Then disc 47 and ratchet 48 with yoke thereon is threaded upon shaft portion 29 until portion 27 is fully nested in bearing 25. No additional lock is required for the ratchet 48 serves as a nut to prevent axial escape of the shaft from its bearings. Thereafter pawl 44, spring 45, and bolt 43 may be applied.

In Figs. 4 and 5, there is illustrated a sprocket and sprocket chain embodiment of the invention. In this form, the flexible, substantially non-extensible chain is not wound up and unwound as in the preceding form but passes through the housing in reverse directions.

In Figs. 4 and 5, numerals of the one hundred series designated parts similar or identical to parts illustrated in Figs. 1 to 3 and designated by numerals of the primary series.

Herein the open rectangular body includes a depending projection 116 apertured at 116a for selective connection of the chain 169. Said projection herein is telescoped into the standard 114. The two ratchets, two clutch discs, the shaft, and the handle herein are identical to those illustrated in Figs. 1 to 3. The drum therein, however, is in Figs. 4 and 5 replaced by a sprocket 134 provided with two side clutch plates 136, and same preferably are integral but can be separate pieces subsequently connected together. This unit as before is keyed to the shaft against relative rotation therebetween, while permitting relative axial movement when required for the purposes previously set forth.

The simplicity of construction, ease of assembly and positiveness of operation inherent in the first form are likewise retained in the second form.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. Structure including in combination an open rectangular housing, a shaft rotatably supported at opposite ends thereby and insertable from but one end, a one-way rotatable means carried by the shaft, the shaft and means being relatively rotatable in opposite directions, an elongated flexible, substantially inextensible line means, a rotatable member, non-rotatable relative to the shaft, but axially slidable relative to the housing and operatively engaged with the line means for movement thereof in either direction, the rotatable member and one-way rotatable means having coaxial clutching association therebetween, a ratchet concentric with the shaft, a thread connection therebetween, a pivotally mounted oscillatable handle, the pivot axis thereof being coincident with the shaft axis, and dual purpose pawl means carried by the handle and normally constrained to ratchet engagement, the ratchet and rotatable member having coaxial clutching association therebetween, the ratchet serving as a shaft retaining nut.

2. Structure including in combination an open rectangular housing, the width thereof at opposite ends being sufficient for providing aligned shaft bearings therein, a shaft disposed across the housing and solely supported at the ends by the housing bearings, mechanism disposed upon and carried by said shaft and limited in axial movement thereon by said housing, said mechanism including a relatively stationary ratchet, a relatively flexible means supporting member, a friction member therebetween, a second friction member at the other end of said supporting means, a second ratchet having operative association with the second friction member and threaded association with said shaft for limited axial movement toward and away from said supporting means, a power applying pawl associated with the second ratchet, and a handle rotatable relative to the shaft and mounting said pawl, and a second pawl mounted upon the housing and adapted for first ratchet engagement.

3. Structure as defined by claim 2 wherein the handle is rotatably mounted upon an extension of the second ratchet, and the first pawl is arranged for reversible association therewith, and means normally constraining the reversible pawl to ratchet engagement in either reversed position.

FREDRICK W. COFFING.

REFERENCES CITED

The following references are of record in the file of this patent:

UNITED STATES PATENTS

| Number | Name | Date |
|---|---|---|
| 969,146 | Soule | Aug. 30, 1910 |
| 1,437,681 | Rathbun et al. | Dec. 5, 1922 |
| 1,437,987 | Miller | Dec. 5, 1922 |
| 1,680,515 | Gormley | Aug. 14, 1928 |
| 1,913,508 | Phillips | June 13, 1933 |

FOREIGN PATENTS

| Number | Country | Date |
|---|---|---|
| 79,782 | Austria | July 15, 1919 |